on 
United States Patent

(12) United States Patent
Pope et al.

(10) Patent No.: US 7,100,200 B2
(45) Date of Patent: Aug. 29, 2006

(54) METHOD AND APPARATUS FOR TRANSMITTING AUTHENTICATION CREDENTIALS OF A USER ACROSS COMMUNICATION SESSIONS

(75) Inventors: David E. Pope, Coral Springs, FL (US); Terry N. Treder, Highland Beach, FL (US); Bradley J. Pedersen, Parkland, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 1164 days.

(21) Appl. No.: 09/880,268

(22) Filed: Jun. 13, 2001

(65) Prior Publication Data

US 2002/0194473 A1   Dec. 19, 2002

(51) Int. Cl.
*G06F 7/04* (2006.01)
*G06F 9/00* (2006.01)

(52) U.S. Cl. .......................................... 726/10; 726/17
(58) Field of Classification Search .............. 726/9–10, 726/5–6, 17, 19
See application file for complete search history.

(56) References Cited

U.S. PATENT DOCUMENTS

| | | | | |
|---|---|---|---|---|
| 4,924,378 A | 5/1990 | Hershey et al. | ............. | 364/200 |
| 5,204,897 A | 4/1993 | Wyman | ........................ | 380/4 |
| 5,359,721 A | 10/1994 | Kempf et al. | ............... | 395/425 |
| 5,390,297 A | 2/1995 | Barber et al. | ............... | 395/200 |
| 5,412,717 A | 5/1995 | Fischer | .......................... | 380/4 |
| 5,455,953 A | 10/1995 | Russell | ....................... | 395/739 |
| 5,491,750 A | 2/1996 | Bellare et al. | ................ | 380/21 |
| 5,504,814 A | 4/1996 | Miyahara | .......................... | 380/4 |
| 5,509,070 A | 4/1996 | Schull | ........................... | 380/4 |
| 5,524,238 A | 6/1996 | Miller et al. | ................ | 395/600 |
| 5,544,246 A | 8/1996 | Mandelbaum et al. | ........ | 380/23 |
| 5,550,976 A | 8/1996 | Henderson et al. | .... | 395/200.06 |
| 5,550,981 A | 8/1996 | Bauer et al. | ........... | 395/200.06 |
| 5,553,139 A | 9/1996 | Ross et al. | ..................... | 380/4 |
| 5,557,732 A | 9/1996 | Thompson | ................... | 395/161 |
| 5,564,016 A | 10/1996 | Korenshtein | ................ | 395/186 |
| 5,592,549 A | 1/1997 | Nagel et al. | ................... | 380/4 |
| 5,604,490 A | 2/1997 | Blakley, III et al. | .... | 340/825.31 |
| 5,604,801 A * | 2/1997 | Dolan et al. | ................ | 713/159 |

(Continued)

FOREIGN PATENT DOCUMENTS

EP    0 575 765 A1    12/1993

(Continued)

OTHER PUBLICATIONS

Patent Cooperation Treaty, International Search Report, International Application No. PCT/US02/18295, mailed on Nov. 20, 2002, 3 pages.

(Continued)

*Primary Examiner*—Norman M. Wright
(74) *Attorney, Agent, or Firm*—John D. Lanza; Choate, Hall & Stewart, LLP

(57) ABSTRACT

The invention relates to an apparatus and for facilitating the reauthentication of a user using a client computer to a server computer. In one embodiment, the method includes the steps of receiving, by the server, confidential information during a first communication session between the server and a client, encrypting the confidential information with a key to create encrypted confidential information, and storing the encrypted confidential information in the server's memory. The method also includes the steps of transmitting, by the server, the key to the client and deleting, by the server, the key from the server's memory. When the server receives the key from the client during a second communication session, the server uses the key to decrypt the encrypted confidential information.

22 Claims, 3 Drawing Sheets

U.S. PATENT DOCUMENTS

| | | | |
|---|---|---|---|
| 5,638,513 A | 6/1997 | Ananda | 395/188.01 |
| 5,657,390 A | 8/1997 | Elgamal et al. | 380/49 |
| 5,666,501 A | 9/1997 | Jones et al. | 345/348 |
| 5,668,999 A | 9/1997 | Gosling | 395/704 |
| 5,689,708 A | 11/1997 | Regnier et al. | 395/682 |
| 5,729,734 A | 3/1998 | Parker et al. | 395/609 |
| 5,737,416 A | 4/1998 | Cooper et al. | 380/4 |
| 5,742,757 A | 4/1998 | Hamadani et al. | 395/186 |
| 5,774,551 A * | 6/1998 | Wu et al. | 713/155 |
| 5,794,207 A | 8/1998 | Walker et al. | 705/23 |
| 5,944,791 A | 8/1999 | Scherpbier | 709/218 |
| 5,956,407 A | 9/1999 | Slavin | 380/30 |
| 6,058,480 A | 5/2000 | Brown | 713/201 |
| 6,192,473 B1 * | 2/2001 | Ryan et al. | 713/168 |
| 6,199,113 B1 | 3/2001 | Alegre et al. | 709/229 |
| 6,424,718 B1 * | 7/2002 | Holloway | 380/277 |
| 6,760,752 B1 * | 7/2004 | Liu et al. | 709/206 |
| 2002/0029340 A1 | 3/2002 | Pensak et al. | 713/182 |

FOREIGN PATENT DOCUMENTS

| | | |
|---|---|---|
| EP | 0 679 980 A1 | 11/1995 |
| EP | 0 851 628 A1 | 7/1998 |
| GB | 2 168 831 A | 6/1986 |
| WO | 97/18635 | 5/1997 |
| WO | 00/72506 | 11/2000 |

OTHER PUBLICATIONS

IBM: "IBM Operating System/2 Version 1.2 Profile Validation Hooks", pp. 1-26, Nov. 22, 1989.

N.F. Maxemchuk, S. Low, "The Use of Communications Networks to Increase Personal Privacy" from *IEEE INFOCOM'95*, Proceedings, vol. 2, Apr. 2-61995, pp. 504-512.

P.Y.A. Ryan, S.A. Schneider, "An attack on a recursive authentication protocol A cautionary tale" *Information Processing Letters 65*, 1998 Elsevier Science B.V., pp. 7-10.

Dave Otway and Owen Rees, "Efficient and Timely Mutual Authentication", The ANSA Project, 24 Hills Road, Cambridge CB21JP United Kingdom, pp. 8-10.

Lawrence C. Paulson, "Mechanized Proofs for a Recursive Authentication Protocol" Computer Laboratory, University of Cambridge, Pembroke Street, Cambridge CB2 3QG, England, pp. 84-94.

Li Gong, "Using One-Way Functions for Authentication" University of Cambridge Computer Laboratory, Cambridge CB2 3QG, England, Jul. 1989, pp. 8-11.

Mark Nicholson, "How To Hold Mobile Users To Account" Financial Times, Tuesday, May 2, 2000.

Tony Savvas, "Handset Giants Launch Security System" www.computerweekly.com.

Charles Seife, "Algorithmic Gladiators Vie For Digital Glory" www.sciencemag.org, Science, vol. 288, May 19, 2000, pp. 1161 & 1163.

Russell Kay, "Authentication" Computerworld, Mar. 27, 2000, pp. 77-79.

Tom Yager, "OS Paradise" BYTE, Nov. 1995.

Bridget Allison, Robert Hawley, Andrea Borr, Mark Muhlestein, David Hitz, "File System Security: Secure Network Data Sharing For NT And UNIX" Network Appliance, Inc., Tech Library, Jan. 16, 1998 pp. 1-16 (double sided).

"Network Neighborhood", http://www.internet.com, © 1999 internet.com.

Howard Millman, "Give Your Computer the Finger", Computerworld, Mar. 27, 2000.

B. Clifford Neuman, "Proxy-Based Authorization and Accounting for Distributed Systems", © IEEE, May 25, 1993, pp. 283-291.

Win95 Tutorial: Index of Topics, http://orion.valencia.cc.fl.us/tutorials/Win95demo/net.html, printed Dec. 27, 1999 (2 pages).

IPEA/US, International Preliminary Examination Report, PCT Application No. PCT/US02/18295, mailed on Dec. 15, 2003, 4 pages.

* cited by examiner

| Client 10 | Communication channel 18 | Server 15 |
|---|---|---|

*Break in First Communication Session* — [Step 150]

| Transmit First Key and First SID [Step 155] | → First Key, First SID → | Decrypt Encrypted Authentication Credentials - [Step 160] |
|---|---|---|
| | | ↓ |
| | | Create Second Key - [Step 170] |
| | | ↓ |
| | | Encrypt New Authentication Credentials with Second Key - [Step 175] |
| | | ↓ |
| | | Create Second SID - [Step 180] |
| | | ↓ |
| Store Second SID and Second Key - [Step 190] | ← Second Key, Second SID | Transmit Second Key and Second SID to Client - [Step 185] |
| | | ↓ |
| | | Delete Second Key - [Step 195] |

FIG. 2B

METHOD AND APPARATUS FOR TRANSMITTING AUTHENTICATION CREDENTIALS OF A USER ACROSS COMMUNICATION SESSIONS

FIELD OF THE INVENTION

The invention relates to the field of client-server communications and, more specifically, to a method and apparatus for facilitating the reauthentication of a user using a client computer to a server computer.

BACKGROUND OF THE INVENTION

A user typically provides authentication credentials, such as a login password, to a server computer at the start of or during a communication session. The server computer typically maintains a centralized storage area in the memory of the server computer for the storage of the authentication credentials, which are typically encrypted in some manner. The server computer can then check the authentication credentials received from the user against the encrypted authentication credentials stored in the server's computer's memory to authorize the user's access to the server.

If an established communication session between the user and the server computer abnormally terminates, the user generally has to reestablish the connection by starting a new communication session. To begin the new communication session, the user typically has to retransmit the authentication credentials (e.g., login password) to the server computer so that the server computer can authorize the user for the new communication session. This retransmission of the authentication credentials of a user across multiple communication sessions repeatedly exposes the authentication credentials of that user to potential attackers, thereby decreasing the level of security of the authentication credentials. Thus, it is desirable to provide a technique for reestablishing a communication session between a client computer and a server computer without repeatedly transmitting the authentication credentials.

SUMMARY OF THE INVENTION

The invention relates to an apparatus and method for eliminating the retransmission of a single user's authentication credentials after the termination of a previous communication session. To eliminate the retransmission, a server encrypts authentication credentials with a key and associates the encrypted authentication credentials with a session identifier (SID). The SID identifies the current communication session. The server then transmits the encryption key and the SID to the client and then deletes the key from the memory of the server. The server can then only decrypt the encrypted authentication credentials when the server receives the SID and the key from the client. The server uses the SID to locate the correct key and then uses the key to decrypt the encrypted authentication credentials.

In one embodiment, the invention relates to a method for facilitating the reauthentication of a client to a server. In one embodiment, the method includes the steps of receiving, by the server, authentication credentials at the start of or during a first communication session between the server and the client and encrypting the authentication credentials with a key to create encrypted authentication credentials. The server then creates a session identifier (SID) to identify the communication session and stores the encrypted authentication credentials and the SID in the server's memory. The method also includes the steps of transmitting the key and the SID to the client and then deleting the key from the server's memory. When the server receives the key and the SID from the client during a second communication session, the server uses the SID to locate the correct encrypted authentication credentials and then uses the key to decrypt the encrypted authentication credentials.

The invention also relates to a system for facilitating the reauthentication of a client to a server. The server computer includes a memory, a key generator, a SID generator, a key destroyer, and an encryptor. The server computer receives authentication credentials from the client computer. The key generator then generates a key and the SID generator generates a SID for the communication session. The encryptor then encrypts the authentication credentials with the key to create encrypted authentication credentials. The encryptor then stores the encrypted authentication credentials and the SID in the memory of the server. The server then transmits the key and the SID to the client computer. The key destroyer then deletes the key from the server's memory following the transmission of the key to the client.

The server computer also includes a decryptor. When the server receives the key and the SID from the client at the start of or during a second communication session, the server uses the SID to locate the encrypted authentication credentials associated with the user. The decryptor then decrypts the encrypted authentication credentials using the key received from the client and re-authenticates the user.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention may be better understood by referring to the following description taken in conjunction with the accompanying drawings in which:

FIG. 2B is a flow diagram of the steps followed in an embodiment of the computer system of FIG. 1 to maintain authentication credentials during a second communication session following the termination of the first communication session of FIG. 2A in accordance with the invention.

DESCRIPTION OF THE PREFERRED EMBODIMENT

Figure 1:
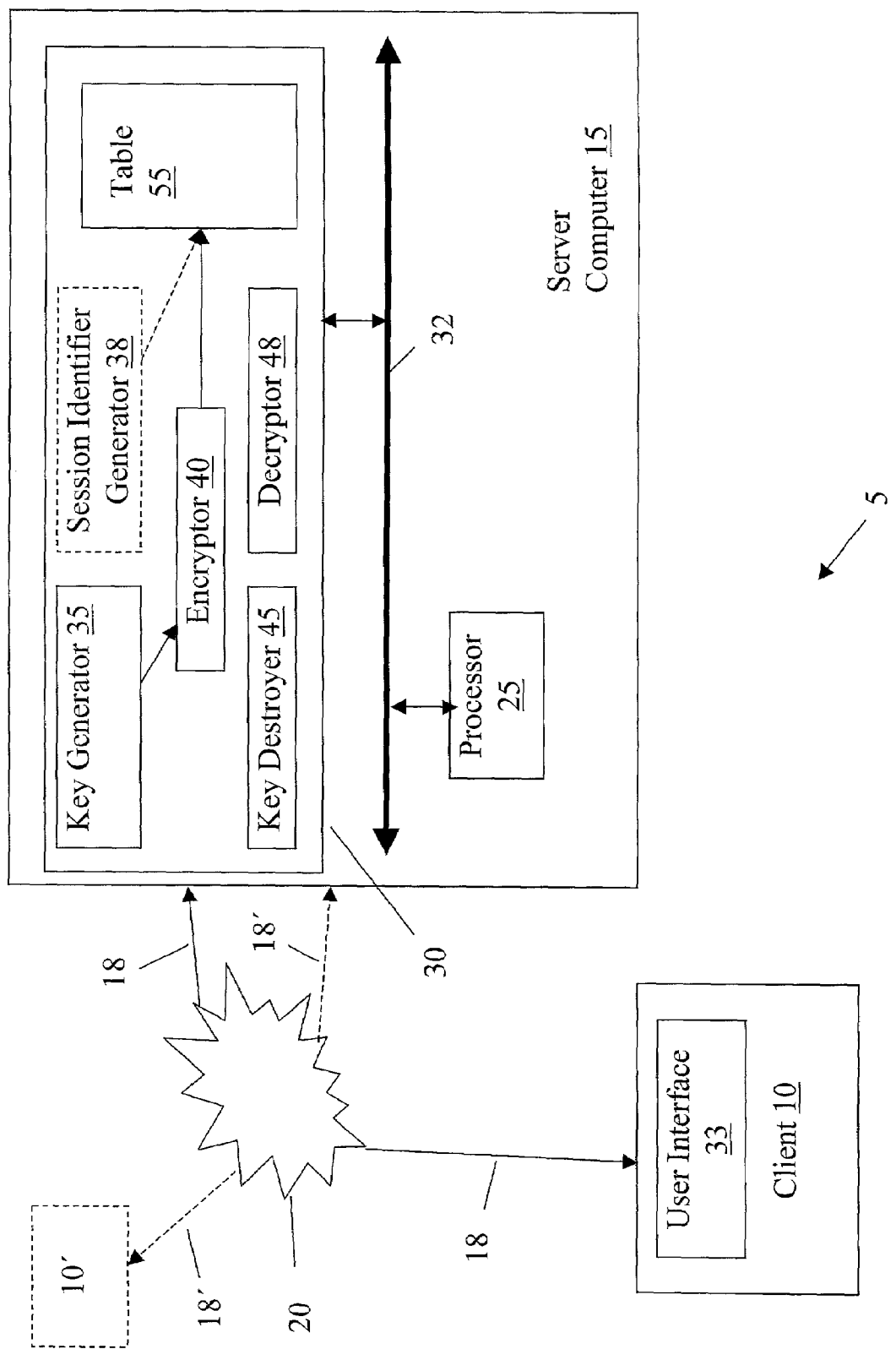
FIG. 1 is a block diagram of an embodiment of a computer system to maintain authentication credentials in accordance with the invention.

Referring to FIG. 1, and in brief overview, a computer system 5 in one embodiment includes a client computer 10, also referred to as a client, in communication with a server computer 15, also referred to as a server, over a communication channel 18. The communication channel 18 may include a network 20. For example, the communication channel 18 can be over a local-area network (LAN), such as a company Intranet, or a wide area network (WAN) such as the Internet or the World Wide Web.

In another embodiment, the computer system 5 includes multiple clients (e.g., 10') that are in communication with the network 20 over additional communication channels (e.g.,

18'). Although illustrated with two clients 10, 10' (generally 10) and two communication channels 18, 18' (generally 18), any number of clients 10 and any number of communication channels 18 can be used as part of the computer system 5.

In one embodiment, the server 15 includes a processor 25 and memory 30 that communicate over a system bus 32. The memory 30 may include random access memory (RAM) and/or read only memory (ROM). In another embodiment, the server 15 accesses memory 30 from a remote site (e.g., another computer, an external storage device).

The client 10 and the server 15 establish a first communication session over the communication channel 18. In one embodiment, the client 10 transmits authentication credentials to the server 15 so that the server 15 can authenticate the user. The authentication credentials can be any information that the user requesting access to the server 15 considers confidential. Examples of authentication credentials include a login password, credit card information, a social security number, a telephone number, an address, biometric information, a time-varying passcode, and a digital certificate.

After receiving the authentication credentials, the server 15 generates an encryption key. In one embodiment, the encryption key is a random number. The server 15 then encrypts the authentication credentials with the key so that an attacker who gains access to the server 15 cannot access the authentication credentials without the key. The server 15 also generates a session identifier (SID) to identify the communication session that is established between the client 10 and the server 15. The server 15 then stores the encrypted authentication credentials with the SID in the memory 30 and transmits the SID and the key to the client 10 over the network 20. Upon the client's receipt of the SID and the key, the server 15 proceeds to destroy (i.e., delete) the key from its memory 30.

If the first communication session between the client 10 and the server 15 terminates, for example abnormally, the new session can be reestablished without requiring the user to reenter his or her authentication credentials. When the client 10 and the server 15 reestablish a second communication session, the client 10 retransmits the key and the SID to the server 15. The server 15 uses the SID to locate the encrypted authentication credentials in the server's memory 30 and uses the key to decrypt the encrypted authentication credentials. The server 15 then authenticates the user by verifying the user's authentication credentials.

To illustrate, upon an abnormal termination of a first communication session in which the user's login password was the authentication credential, the client 10 attempts to establish a second communication session with the server 15. As part of the request to the server 15 to establish the second communication session, the client 10 transmits the key and the SID of the terminated first communication session to the server 15. Instead of prompting the user to enter the user's login password again, the server 15 uses the SID to locate the encrypted login password associated with the user and uses the key to obtain the user's login password from the server's memory 30.

In more detail and still referring to FIG. 1, the client 10 can be any computing device (e.g., a personal computer, set top box, phone, handheld device, kiosk, etc) that can communicate with the server 15 and can provide a user-interface 33. The client 10 can be connected to the communication channel 18 through a variety of connections including standard telephone lines, LAN or WAN links (e.g., T1, T3, 56 kb, X.25), broadband connections (ISDN, Frame Relay, ATM), and wireless connections. An example of a user interface 33 is a Web browser (e.g., a Microsoft® Internet Explorer browser and/or a Netscape™ browser).

Similar to the client 10, the server 15 can be any of the computing devices described above (e.g., a personal computer) that can access memory 30 and can communicate with the client 10. The server 15 can establish communication over the communication channel 18 using a variety of communication protocols (e.g., ICA, HTTP TCP/IP, IPX, SPX, NetBIOS, Ethernet, RS232, and direct asynchronous connections).

The server 15 includes a key generator 35, a SID generator 38, an encryptor 40, a key destroyer 45, and a decryptor 48. The key generator 35 generates a key when the server 15 receives authentication credentials from the client 10. In one embodiment, the key generator 35 generates a random number for the key. In another embodiment, the key generator 35 derives the key from a characteristic of the server 15. Particular examples include the key generator 35 deriving the key from the temperature of the processor 25, the time that the server 15 received the authentication credentials, and the number of keys stored in memory 30. In a further embodiment, the key and the authentication credentials are the same size (e.g., eight bits). In one embodiment, the key generator 35 is a software module. In another embodiment, the key generator 35 is a random number generator.

The SID generator 38 generates the unique SID to enable the server 15 to identify a particular communication session. In one embodiment, the SID generator 38 is a software module. In another embodiment, the SID generator 38 is a random number generator.

The encryptor 40 encrypts the key with the authentication credentials to create encrypted authentication credentials. In one embodiment, the encryptor 40 encrypts the key with the authentication credentials by performing an exclusive OR operation (i.e., XOR) on the key and the authentication credentials. In another embodiment, the encryptor 40 adds the authentication credentials to the key to encrypt the authentication credentials; that is, the encryptor 40 performs a "Caesar cipher" on the authentication credentials using the key as the shift value. It should be clear that the encryptor 40 can perform any type of manipulation on the authentication credentials as long as the server 15 can decrypt the encrypted authentication credentials with the key.

In one embodiment, the encryptor 40 is a software module that executes mathematical algorithms on the key and the authentication credentials to create the encrypted authentication credentials. In another embodiment, the encryptor 40 is a logic gate of the server computer 15, such as an exclusive OR (XOR) gate. In another embodiment, the encryptor 40 performs a hash function, such as MP4, MP5, and SHA-1, on the authentication credentials.

In one embodiment, the encryptor 40 stores the encrypted authentication credentials and the SID in a table 55 in memory 30. In another embodiment, the encryptor 40 stores the encrypted authentication credentials in the table 55 and the SID generator 38 stores the SID in the table 55. In one embodiment, the table 55 is an area in memory 30 allocated by the processor 25 for use by the encryptor 40. In another embodiment, the encryptor 40 stores the encrypted authentication credentials in a database (not shown).

In one embodiment, the server 15 uses the SID as a vector to the location of the encrypted authentication credentials in the table 55. Thus, the server 15 can locate the encrypted authentication credentials by using a particular SID (as each encrypted authentication credential created by the encryptor 40 is associated with only one SID).

The key destroyer 45 deletes the key once the server 15 determines that the key is no longer needed. In one embodiment, the key destroyer 45 is a delete function of a software program, such as the operating system of the server 15.

The decryptor 48 decrypts the encrypted authentication credentials once the server 15 receives the key and the SID from the client 10. In one embodiment, the decryptor 48 is a software module that performs the inverse function or algorithm that the encryptor 40 performed to create the encrypted authentication credentials. In another embodiment, the decryptor 48 is a hardware component (e.g., a logic gate) to perform the inverse operation of the encryptor 40.

In one embodiment, one or more of the key generator 35, the SID generator 38, the encryptor 40, the key destroyer 45, and the decryptor 48 are joined into one software module. In yet another embodiment, these components 35, 38, 40, 45, 48 can be hardware components, such as logic gates. In a further embodiment, these components 35, 38, 40, 45, 48 are included in a single integrated circuit.

Figure 2A:
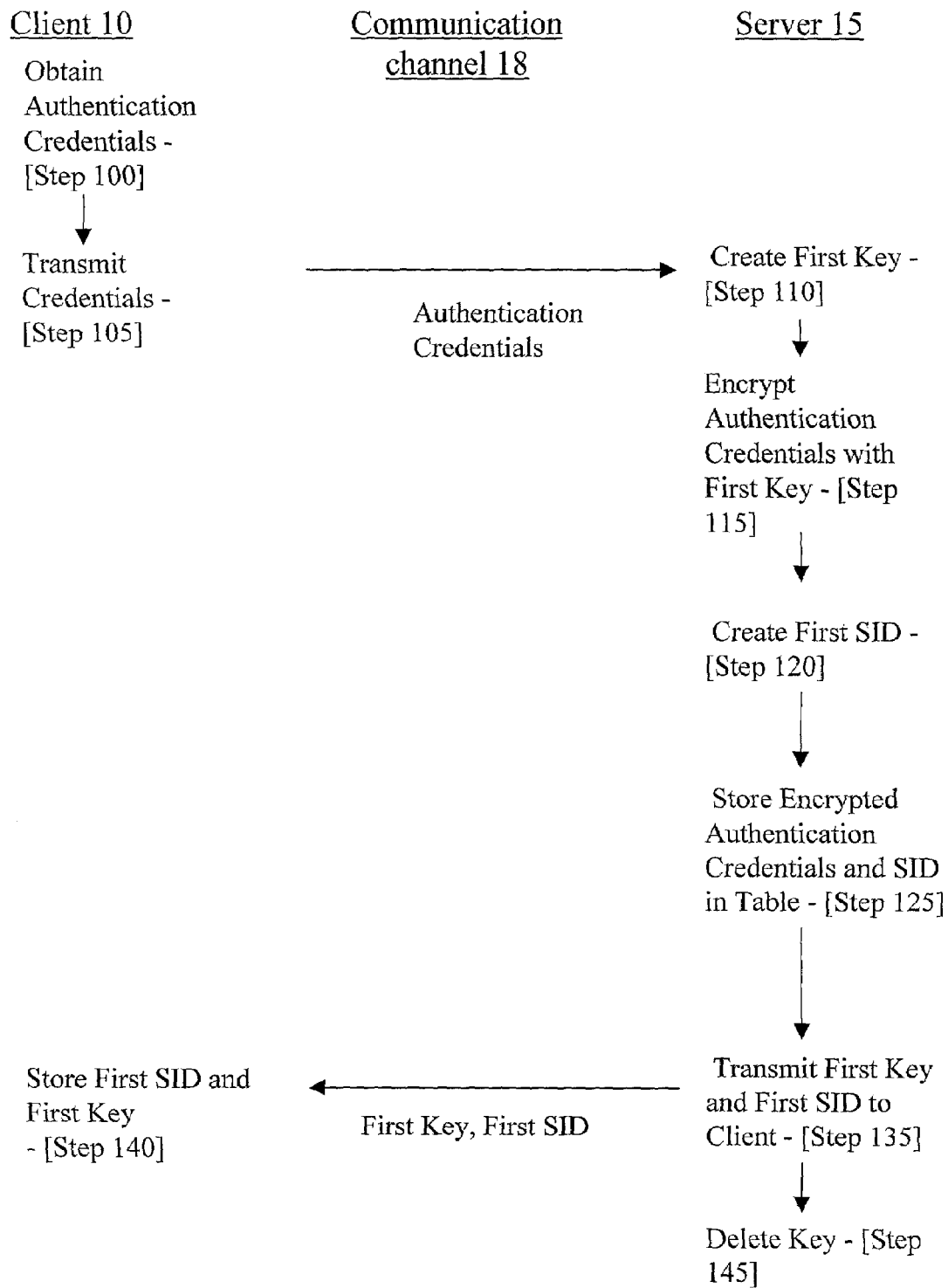
FIG. 2A is a flow diagram of the steps followed in an embodiment of the computer system of FIG. 1 to maintain authentication credentials during a first communication session in accordance with the invention.

Referring also to FIG. 2A, the client 10 establishes a first communication session with the server 15 over the communication channel 18. The client 10 obtains (step 100) authentication credentials from a user of the client 10. In a computer system 5 not using an Open System Interconnection (OSI) protocol as the transmission protocol for communications between the client 10 and the server 15, the authentication credentials may be a login password that is needed to establish the first communication session. In this embodiment, the obtaining of the authentication credentials from the user precedes the establishment of the communication session. In another embodiment, the authentication credential is personal information of the user (e.g., credit card information, social security number) that the client 10 obtains after the first communication session has been established. The client 10 then transmits (step 105) the authentication credentials to the server 15 over the communication channel 18.

After the server 15 receives the authentication credentials, the key generator 35 creates (step 110) a first encryption key for use with the authentication credentials. The encryptor 40 then encrypts (step 115) the authentication credentials with the first key to generate encrypted authentication credentials. The SID generator 38 then creates (step 120) a first SID to identify the first communication session. The encryptor 40 then stores (step 125) the encrypted authentication credentials with the first SID in the table 55 described above.

In one embodiment, the encryptor 40 stores the encrypted authentication credentials and the first SID in a certain location for more efficient retrieval at a later time. For instance, the encryptor 40 stores all encrypted authentication credentials and SIDs that have been created within a predetermined amount of time in RAM 30. The server 15 transfers all encrypted authentication credentials and SIDs created before a predetermined time to a second, external memory (not shown). In another embodiment, the encryptor 40 stores the encrypted authentication credentials and SID in a database.

The SID and the encrypted authentication credentials stored in the memory 30 can be arranged in any particular order and/or format. For example, the SID and encrypted authentication credentials can be stored in chronological order with respect to the creation time of the encrypted authentication credentials.

The server 15 then transmits (step 135) the first key and the associated first SID to the client 10. The client 10 stores (step 140) the first key and the first SID in the client's memory (not shown). The key destroyer 45 then deletes (step 145) the key stored in memory 30.

In another embodiment, the server 15 does not delete the first key from memory 30 until the client 10 notifies the server 15 that the client 10 has received the key. For example, the client 10 transmits an acknowledgment message to the server 15 after the client 10 successfully receives the key. Once the server 15 receives notice (e.g., the acknowledgment message), the key destroyer 45 then deletes (step 145) the key from the memory 30. This prevents the server 15 from deleting the key before the client 10 successfully receives the key. By not deleting the key until receiving the acknowledgement message, the server 15 can retransmit the key and the SID to the client 10 upon a failure in the transmission.

By deleting the key in step 145, the server 15 does not have the mechanism needed to decrypt the encrypted authentication credentials stored in the table 55. Thus, if an attacker accesses the memory 30 of the server 15, the attacker can retrieve the encrypted authentication credentials but cannot decrypt the encrypted authentication credentials (and so cannot read the authentication credentials). In short, the encrypted authentication credentials stored on the server 15 provides no information that the attacker can interpret or understand and the server 15 possesses no information to decrypt the encrypted authentication credentials.

In addition, the client 10 is the only device that can provide the key to the encrypted authentication credentials. With the possibility of many clients 10 as part of the network 20, an attacker may have to attempt to gain access to each client (e.g., 10, 10') individually to find the client 10 that possesses the correct key. This can be time consuming and tedious and, as a result, may deter an attacker from an attempt to decrypt the encrypted authentication credentials.

Further, and also referring to FIG. 2B, if the first communication session ends abnormally (step 150), the client 10 can transmit (step 155) the first SID and the first key to the server 15 during a second communication session without retransmitting the authentication credentials.

In another embodiment, the server 15 has a timeout feature with respect to accessing the encrypted authentication credentials. For instance, the server 15 starts a timer after the first communication is abnormally terminated. If the timer reaches a predetermined value before the client 10 reestablishes the second communication session and transmits the key to the server 15 for decryption, the server 15 deletes the encrypted authentication credentials from the table 55. If no timer is used, the key acts as a de facto password for future sessions.

Once the server 15 receives the first key and the first SID from the client 10 (at the start of or during the second communication session, the server 15 uses (step 160) the first SID to locate the encrypted authentication credentials and then the decryptor 48 uses the first key to decrypt the encrypted authentication credentials.

In one embodiment, during the second communication session, the key generator 35 creates (step 170) a second key for the authentication credentials and the key encryptor 40 then encrypts (step 175) the authentication credentials with the second key to generate second encrypted authentication credentials. The SID generator 38 also creates (step 180) a second SID to identify the second communication session. The encryptor 40 stores the second encrypted authentication credentials with the second SID in the table 55.

The server 15 then transmits (step 185) the second key and the second SID to the client 10. The client 10 then stores (step 190) the second key and the second SID in memory (not shown) for future retrieval. The key destroyer 45 then deletes (step 195) the second key from the memory 30. Thus, the server 15 can only decrypt the second encrypted authentication credentials upon reception of the second key and the second SID from the client 10. The server 15 has created a new key and a new SID for the second communication session that is used with the same authentication credentials that the user had transmitted during the first communication session. Therefore, a user's authentication credentials do not have to be retransmitted upon a second communication channel after an abnormal termination of the first communication session.

Although the invention is discussed in terms of authentication credentials, any confidential information which can be maintained across sessions if there is a communication failure can be used. Thus if credit card information is required by an application and the credit card information is sent to the server, the subsequent disconnect between the client and the server does not require the credit card information to be reentered if this invention is used. Further, although a session identifier, or SID, is discussed as providing a pointer to the stored authentication credentials, any number which is suitable as a pointer may be used.

The invention may be embodied in other specific forms without departing from the spirit or essential characteristics thereof. The foregoing embodiments are therefore to be considered in all respects illustrative rather than limiting on the invention described herein. The scope of the invention is thus indicated by the appended claims rather than by the foregoing description, and all changes which come within the meaning and range of equivalency of the claims are therefore intended to be embraced therein.

What is claimed is:

1. A method for facilitating the reauthentication of a user using a client computer to a server computer comprising the steps of:
   (a) receiving confidential information from the client computer;
   (b) establishing a first communication session between the client computer and the server computer;
   (c) generating a key;
   (d) encrypting the confidential information with the key to create encrypted confidential information;
   (e) storing the encrypted confidential information on the server computer;
   (f) transmitting the key to the client computer; and
   (g) deleting the key on the server computer.

2. The method of claim 1 further comprising the steps of:
   (h) establishing a second communication session after deleting the key on the server computer;
   (i) receiving the key associated with the encrypted confidential information from the client computer during the second communication session; and
   (j) using the key by the server computer to decrypt the encrypted confidential information.

3. The method of claim 2 wherein step (h) further comprises the steps of:
   (h-a) receiving an identifier associated with the first communication session from the client computer during the second communication session before using the key to decrypt the encrypted confidential information; and
   (h-b) using the identifier to locate the encrypted confidential information before using the key to decrypt the encrypted confidential information.

4. The method of claim 1 wherein step (e) further comprises the step of:
   (e-a) creating an identifier by the server computer prior to transmitting the key to the client computer; and
   (e-b) storing the identifier on the server computer.

5. The method of claim 2 further comprising the step of establishing the second communication session between the client computer and the server computer upon termination of the first communication session.

6. The method of claim 2 further comprising the steps of:
   (k) creating a second key during the second communication session;
   (l) creating a second identifier during the second communication session;
   (m) encrypting the confidential information with the second key to create second encrypted confidential information;
   (n) storing the encrypted confidential information and the second identifier on the server computer;
   (o) transmitting the second key and the second identifier to the client computer; and
   (p) deleting the second key on the server computer.

7. The method of claim 4 wherein the identifier further comprises a pointer to the encrypted confidential information.

8. The method of claim 4 wherein the identifier is a session identifier.

9. The method of claim 1 wherein encrypting of the confidential information and the key further comprises performing an exclusive OR operation on the confidential information and the key.

10. The method of claim 1 further comprising enabling access to the encrypted confidential information for a predetermined amount of time.

11. The method of claim 1 wherein the encrypted confidential information is stored in a database.

12. The method of claim 1 wherein the confidential information is a password.

13. A system for facilitating reauthentication of a user using a client computer to a server computer, the system comprising:
   (a) a client computer; and
   (b) a server computer comprising
      a memory,
      a key generator,
      a key destroyer,
      an encryptor, and
      a decryptor,
   the server computer in electrical communication with the client computer;
   wherein the server computer receives confidential information from the client computer during a first communication session between the server computer and the client computer,
   wherein the key generator generates a key,
   wherein the encryptor encrypts confidential information received from the client computer with the key to create encrypted confidential information,
   wherein the encryptor stores the encrypted confidential information in the memory of the server computer,
   wherein the server computer transmits the key to the client computer, and
   wherein the key destroyer destroys the key following transmission to the client computer.

14. The system of claim 13 wherein the server computer receives the key during a second communication session.

15. The system of claim 13 wherein the decryptor decrypts the encrypted confidential information in the memory using the key.

16. The system of claim 13 wherein the confidential information is personal information associated with a user of the client computer.

17. The system of claim 13 further comprising an identifier generator that generates an identifier.

18. The system of claim 17 wherein the identifier generator associates the identifier with the encrypted confidential information.

19. The system of claim 13 wherein the identifier is a session identifier.

20. A system for facilitating the reauthentication of a client computer to a server computer, the system comprising:
 (a) a client computer; and
 (b) a server computer comprising
  a memory,
  a key generator,
  a key destroyer,
  an identifier generator,
  an encryptor, and
  a decryptor,
 the server computer in electrical communication with the client computer;
 wherein the server computer receives confidential information from the client computer during a first communication session between the server computer and the client computer,
 wherein the key generator generates a key,
 wherein the encryptor encrypts confidential information received from a client with the key to create encrypted confidential information,
 wherein the identifier generator generates an identifier,
 wherein the server computer stores the encrypted confidential information and the identifier in the memory of the server computer,
 wherein the server computer transmits the key and the identifier to the client computer,
 wherein the key destroyer destroys the key following transmission to the client computer, and
 wherein the server computer receives the key and the identifier during a second communication session to enable the decryptor to decrypt the encrypted confidential information in the memory.

21. A method for facilitating the reauthentication of a client computer to a server computer comprising the steps of:
 (a) establishing a first communication session between a client computer and a server computer;
 (b) receiving confidential information from the client computer;
 (c) creating an identifier by the server computer to identify the first communication session after receiving the confidential information;
 (d) encrypting the confidential information with a key to create encrypted confidential information;
 (e) storing the encrypted confidential information and the identifier in a table in memory of the server computer;
 (f) transmitting, by the server computer, the key and the identifier to the client computer;
 (g) deleting, by the server computer, the key from the memory of the server computer;
 (h) establishing a second communication session between the client computer and the server computer upon termination of the first communication session;
 (i) receiving, from the client computer, during the second communication session, the identifier that identifies the first communication session;
 (j) receiving, from the client computer, during the second communication session, the key associated with the encrypted confidential information;
 (k) using the identifier to determine the location of the encrypted confidential information in the table; and
 (l) decrypting, by the server computer, the encrypted confidential information using the key received from the client computer during the second communication session.

22. A computer system for facilitating reestablishment of communications between a client computer and a server computer comprising:
 (a) means for receiving confidential information from a client computer during a first communication session;
 (b) means for encrypting the confidential information with a key to create encrypted confidential information;
 (c) means for storing the encrypted confidential information;
 (d) means for transmitting the key to the client computer;
 (e) means for deleting, by the server computer, the key from memory of the server computer;
 (f) means for receiving the key associated with the encrypted confidential information from the client during a second communication session; and
 (g) means for using the key to decrypt the encrypted confidential information.

* * * * *